Figure 1:
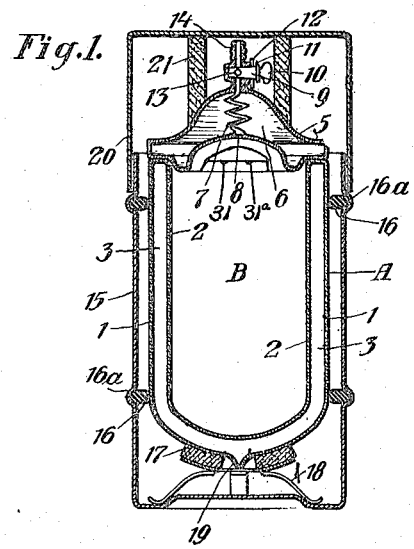

Nov. 25, 1924.

R. BURGER

VACUUM JACKETED VESSEL

Filed March 11, 1924

1,517,047

Inventor
R. Burger
By Marks Clerk
Attys

Patented Nov. 25, 1924.

1,517,047

UNITED STATES PATENT OFFICE.

REINHOLD BURGER, OF BERLIN, GERMANY.

VACUUM-JACKETED VESSEL.

Application filed March 11, 1924. Serial No. 698,501.

*To all whom it may concern:*

Be it known that I, REINHOLD BURGER, a citizen of the Republic of Germany, and residing at Berlin, Germany, have invented certain new and useful Improvements in Vacuum-Jacketed Vessels, of which the following is a specification.

My invention relates to an improved vacuum-jacketed vessel particularly of the type in which both the main body of the vessel and the closure thereof, such as a cover, a cap, a stopper or the like, are vacuum-jacketed, whereby the object aimed at by the jacket is accomplished in a higher degree.

The object of my invention is to provide a vacuum-jacketed vessel of the type set forth with means for producing a vacuum in its useful room so that the air which otherwise, that is to say in the vessels of the kind hitherto suggested or employed, acts as a heat conductor and transmitter will not be present in my improved vessel and consequently the object striven for by the jacket will be accomplished in a higher degree.

With this object in view I provide a valve in the vessel constructed and arranged to allow of producing the desired vacuum in the useful space of the vessel over and above the contents thereof and the said valve may be inserted either in the cover, cap or stopper or else in the side wall of the inner container or vessel properly speaking. Preferably I combine the valve with a short pipe or tube provided with means for readily attaching thereto and detaching therefrom an air-pump or some other suitable device for exhausting or sucking out the air from the inner container.

A vacuum thus produced in the vessel also contributes to firmly secure the cap, cover or stopper, with or without the agency of a sealing gasket, to the body of the vessel owing to the pressure of the outer air, so that an absolutely tight closure will be obtained. As already mentioned a gasket may be inserted intermediate between the rim of the mouth of the vessel and the cover, cap or stopper, but in some cases I have found that a perfectly tight sealing can be ensured without the aid of a gasket by simply grinding the co-operating faces of the mouth of the vessel and of the cover, cap or stopper so that said faces will be perfectly smooth and even to give a tight fit.

A further object of my invention is to provide between the inner vessel and the cover, cap or stopper fine grooves, channels or fine tubes for the purpose of obtaining a communication between the inner vessel the outer space within the protective casing or outer vessel. I tighten such grooves, channels or tubes so as to allow of introducing conducting wires in an air-tight manner for the purpose of making measuring tests at any desired vacuum, it also being possible to further exhaust or change the vacuum in the hollow room of the inner vessel during such measuring operations, as desired.

Figure 4:
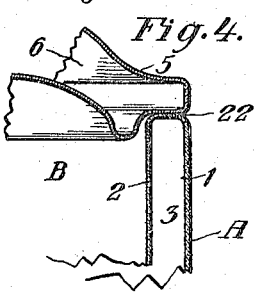
Figure 2:
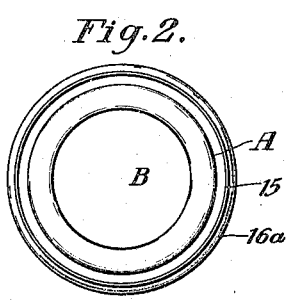
Figure 5:
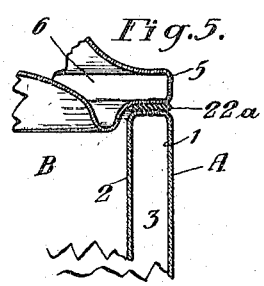
Figures 6, 7:
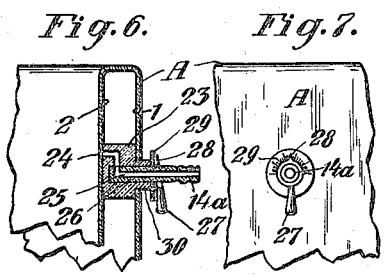
Figure 8:
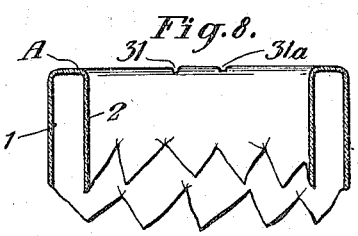
Figure 10:
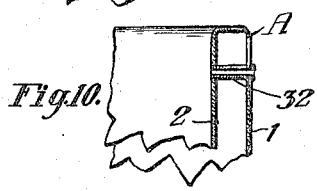
Figure 9:
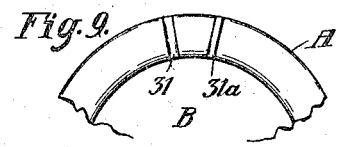

Having thus set forth in general the principles upon which my invention depends, I shall now particularly describe simple embodiments thereof which I have shown diagrammatically in the accompanying drawings for the purpose of more fully disclosing my invention. In the drawings Figure 1 is a vertical, central section of a vacuum jacketed vessel constructed in accordance with my invention, Figure 2 is a top view thereof with the covers removed, Figure 3 is a sectional view of a modification of the inner cover, Figures 4 and 5 are sectional views illustrating the sealing means employed between the inner vessel and its cover, Figure 6 is a sectional view of the walls of the inner vessel with the aforementioned valve inserted therein, Figure 7 is a front view thereof, Figures 8 and 9 are fragmentary views of the top portion of the inner vessel with the hereinbefore stated fine grooves or passages therein for the insertion of conducting wires, and Figure 10 is a fragmentary sectional view similar to that of Figure 8 and showing the modification of employing a fine tube in lieu of the passage in Figures 8 and 9.

The double-walled vessel A is of known construction comprising an outer container 1 and an inner container 2 with a vacuum-jacket 3 therebetween. The cover 5 is likewise double-walled to constitute a vacuum jacket 6.

According to my invention a tube 7 is mounted in the cover 5 to extend from the inner wall 8 through the vacuum space 6 and the outer wall thereof. The outwardly projecting end of the tube 7 is constructed and shaped to form the body or casing of a cock comprising a plug 9 with a handle 10 and a pointer 11 in front of a scale 12 to indicate the relative position of the bore 13 of the plug with relation to the passage or channel afforded by the tube 7. The outer extremity 14 of the tube 7 is suitably shaped in the form of a hollow stud for connection with an air-pump or the like for the evacuation of the inner space B of the container A.

Figure 3:

In all cases where I provide the means for evacuating the space B of the container in the side wall of the latter, the cover may be constructed as shown in Figure 3, that is to say, with a reinforcing means inserted between and connected with the walls thereof. Said reinforcing means may consist of a short glass stick or tube $x$ having a few helical windings, such as $y$, and adapted to steady the cover so that the latter will have sufficient rigidity to withstand the pressure of the atmosphere when a vacuum has been created in the space B. The inner vessel or vessel properly speaking A, is enclosed or housed in a protective casing or receptacle 15 of sheet metal or the like to practically form a unit therewith, or the vessel generally speaking, and to hold the two preferably cylindrical bodies A and 15 the required distance apart from each other rubber rings 16 are embedded in annular grooves $16^a$ of the casing 15 to encircle the container A and maintain the same in parallel and coaxial relationship to the said casing 15. For a similar purpose the bottom of the vessel A is supported by an annular body 17 made of felt, rubber or any other appropriate resilient material and in turn yieldingly supported by elastic springs 18 forming at the same time an open seat on the bottom of the casing 15 for the capillary nose of the outer container 1 to lie therein safely protected from concussion and fracture.

The whole body comprising the two containers 1 and 2 and the protective casing 15 is closed at the top by a second cover 20. Inserted between the cover 20 and the cover 5 is an annular body made of felt, rubber or any other suitable material of resilient nature and which acts to firmly and safely hold the vessel A in its protective casing 15 and to also protect particularly the projecting extremity of the tube 7 with the cock against concussion or fracture.

As hereinbefore stated a tight joint between the rim of the vessel A and the cover 5 may be obtained either by grinding the co-operating faces of the two parts to render them perfectly even and smooth as at 22, Figure 4, or by inserting a gasket $22^a$ between the two faces, as shown in Figures 5, to ensure a tight sealing closure.

Figures 6 and 7 illustrate the modification of mounting the valve in the side walls of the vessel A. In this embodiment of my invention the valve body or casing 23 is made of a material which is a bad conductor of heat and has a passage or channel 24 communicating at its one end with the inner space of the vessel and at its other end with the bore 25 of the cock 26. Also in this case the cock has a handle 27 and a pointer 28 in front of a scale 29. The length of the elongated bushing 30 is preferably dimensioned to project from the protective casing, such as shown in Figure 1, or to be in contact therewith, if a casing of the kind is to be employed in connection with the vessel shown in Figures 6 and 7. In case that the vessel is to be housed in a protective casing such as shown in Figure 1, first the latter will have to be properly mounted thereon and thereafter the cock 26 with its handle 27 and the scale 29 will have to be connected with the bushing or projecting part 30 of the casing 23. The properly shaped extremity or tubular stud $14^a$ of the valve tube is intended, as in the embodiment shown in Figure 1, for the application of an air-pump or the like.

Referring to Figures 8 and 9 the rim or top face of the vessel A is provided with depressions or grooves 31 and $31^a$ adapted for embedding therein conducting wires for measuring purposes and the like. The measuring operations or tests thus may be carried out while the vessel is or remains closed. The depressions or grooves 31 and $31^a$ are shaped and arranged to allow of being readily packed or tightened. It goes without saying that such depressions or grooves may just as well be provided in the contacting face or rim of the cover 5. Further in some cases it may be advisable or desirable to provide fine tubes 32 within the walls of the vessel A, as shown in Figure 10, in lieu of the depressions or grooves illustrated in Figures 8 and 9. Such tubes must extend through both containers 1 and 2 in order to constitute a passage or communication between the interior of the vessel A and the outer air, and they are inserted in the walls so as to be imbedded therein in an air-tight manner. The passage or channel afforded by a tube of the kind may be closed when not used, by means of an appropriate cementing material which can be readily removed.

From the foregoing description, it will be seen, that simple and sufficient means are herein provided for accomplishing the objects of my invention, but I wish it to be understood that my invention is not limited to the precise construction set forth and that minor changes in the arrangement, construction, and combination of the several parts of my improved vacuum-jacketed vessel may be made and substituted for those herein shown and described without in the least departing from the gist, nature and principle of my invention.

What I claim is:—

1. A vacuum-jacketed vessel comprising a vacuum-jacketed main body provided with transverse grooves in the upper edges thereof adapted to receive conducting wires for measuring purposes, a vacuum-jacketed cover, an exhausting tube mounted through the cover and a valve in said tube, substantially as and for the purposes set forth.

2. A vacuum-jacketed vessel comprising a vacuum-jacketed main body including spaced walls, an annular portion integral with and joining the walls at the upper edge thereof and provided at the upper surface with radial grooves adapted to receive conducting wires for measuring purposes, a vacuum jacketed cover the under surface of which contacts with the annular portion forming part of the main body, an exhausting tube arranged through the cover and communicating with the interior of the main body, a valve in said tube exteriorly of the cover and a tubular stud projecting from the tube adapted to receive the connection of an air pump, substantially as and for the purposes set forth.

In testimony whereof I affix my signature.

REINHOLD BURGER.

Witnesses:
FRANZ SCHWENTERLEY,
BRUNO SCHARWENKA.